(12) United States Patent
Hur et al.

(10) Patent No.: US 12,257,568 B2
(45) Date of Patent: *Mar. 25, 2025

(54) SUPERABSORBENT POLYMER AND PREPARATION METHOD FOR THE SAME

(71) Applicant: LG Chem, Ltd., Seoul (KR)

(72) Inventors: Young Jae Hur, Daejeon (KR); Taebin Ahn, Daejeon (KR); Dong Hoon Park, Daejeon (KR); Jihye Ryu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 782 days.

This patent is subject to a terminal disclaimer.

(21) Appl. No.: 17/424,047

(22) PCT Filed: Sep. 16, 2020

(86) PCT No.: PCT/KR2020/012493

§ 371 (c)(1),
(2) Date: Jul. 19, 2021

(87) PCT Pub. No.: WO2021/054718

PCT Pub. Date: Mar. 25, 2021

(65) Prior Publication Data

US 2022/0080387 A1   Mar. 17, 2022

(30) Foreign Application Priority Data

Sep. 18, 2019 (KR) .................. 10-2019-0114795
Sep. 15, 2020 (KR) .................. 10-2020-0118534

(51) Int. Cl.
  *B01J 20/26*  (2006.01)
  *B01J 20/30*  (2006.01)
  *C08F 120/06*  (2006.01)
  *C08J 3/12*  (2006.01)
  *C08J 3/24*  (2006.01)

(52) U.S. Cl.
  CPC ......... *B01J 20/267* (2013.01); *B01J 20/3021* (2013.01); *B01J 20/3085* (2013.01); *C08F 120/06* (2013.01); *C08J 3/12* (2013.01); *C08J 3/245* (2013.01); *C08F 2810/20* (2013.01); *C08J 2333/02* (2013.01)

(58) Field of Classification Search
  None
  See application file for complete search history.

(56) References Cited

U.S. PATENT DOCUMENTS

| | | | |
|---|---|---|---|
| 4,351,922 A | 9/1982 | Yoshida et al. | |
| 11,278,866 B2 | 3/2022 | Kim et al. | |
| 2016/0220981 A1 | 8/2016 | Yim et al. | |
| 2019/0126240 A1 | 5/2019 | Yoon et al. | |
| 2019/0344243 A1 | 11/2019 | Lee et al. | |
| 2020/0139344 A1* | 5/2020 | Kim ................. | B01J 20/261 |
| 2020/0308352 A1* | 10/2020 | Park ................. | C08J 3/24 |
| 2020/0353442 A1 | 11/2020 | Kumazawa et al. | |
| 2022/0098373 A1 | 3/2022 | Park et al. | |

FOREIGN PATENT DOCUMENTS

| | | |
|---|---|---|
| EP | 2893974 A1 | 7/2015 |
| EP | 2993191 A1 | 3/2016 |
| EP | 3412709 A1 | 12/2018 |
| EP | 3521343 A1 | 8/2019 |
| EP | 3680277 A1 | 7/2020 |
| EP | 3885396 A1 | 9/2021 |
| JP | H07026026 A | 1/1995 |
| JP | 2002284892 A | 10/2002 |
| JP | 2006176570 A | 7/2006 |
| JP | 2011080069 A | 4/2011 |
| JP | 2012001735 A | 1/2012 |
| JP | 2017185485 A | 10/2017 |
| JP | 2020504191 A | 2/2020 |
| JP | 2022514512 A | 2/2022 |
| KR | 100492917 B1 | 6/2005 |
| KR | 101564526 B1 | 10/2015 |
| KR | 2016-0048838 A | 5/2016 |
| KR | 101812895 B1 | 12/2017 |
| KR | 20190068408 A | 6/2019 |
| KR | 20190072406 A | 6/2019 |
| KR | 20190087208 A | 7/2019 |
| WO | 2018180864 A1 | 10/2018 |

(Continued)

OTHER PUBLICATIONS

International Search Report for Application No. PCT/KR2020/012493, mailing Jan. 7, 2021, 2 pages.
Odian, George, Principles of Polymerization, Second Edition, published Oct. 1981, p. 203, John Wiley & Sons, Inc., USA.
Schwalm, Reinhold, "UV Coatings; Basics, Recent Developments and New Applications", Dec. 2006, p. 115, Elsevier Science.
Buchholz, Fredric L. et al., Modern Superabsorbent Polymer Technology, 1998, Chapter 3 p. 73-103.
Catalog of Denacol, an epoxy compound produced by Nagase Kasei Kogyo Co., Ltd, pp. 2-5, p. 12, p. 14, back cover, 14 pgs.

(Continued)

*Primary Examiner* — Christopher M Rodd
(74) *Attorney, Agent, or Firm* — Lerner David LLP

(57) ABSTRACT

A method of preparing a superabsorbent polymer includes preparing a base resin in which an acrylic acid-based monomer having acidic groups which are at least partially neutralized and an internal crosslinking agent are crosslinked; and heating the base resin in the presence of a surface crosslinking agent to carry out surface modification of the base resin, wherein the internal crosslinking agent includes a first epoxy crosslinking agent having an epoxy equivalent weight of 100 g/eq or more to less than 130 g/eq, and a second epoxy crosslinking agent having an epoxy equivalent weight of 130 g/eq or more. A superabsorbent polymer having improved rewetting property liquid permeability is also provided.

13 Claims, No Drawings

(56) References Cited

FOREIGN PATENT DOCUMENTS

| WO | WO-2019112150 A1 | * | 6/2019 | ............. A61L 15/60 |
| WO | WO-2019117513 A1 | * | 6/2019 | ............. C08F 20/06 |

OTHER PUBLICATIONS

Extended European Search Report and European Search Opinion for European Patent Application No. 20865197 dated Feb. 4, 2022, 16 pgs.
Third Party Observation for Application No. PCT/KR2020/012493 submitted Jan. 17, 2022, 13 pgs.
Thomson Scientific, Database WPI Week 201132, Apr. 21, 2011, London, GB; AN 2011-E14837, XP002805413, 2 pgs.

* cited by examiner

SUPERABSORBENT POLYMER AND PREPARATION METHOD FOR THE SAME

CROSS-REFERENCE TO RELATED APPLICATION

The present application is a national phase entry under 35 U.S.C. § 371 of International Application No. PCT/KR2020/012493, filed on Sep. 16, 2020, which claims priority from, Korean Patent Application Nos. 10-2019-0114795 and 10-2020-0118534, filed on Sep. 18, 2019 and Sep. 15, 2020, respectively, the disclosures of which are hereby incorporated by reference herein in their entirety.

TECHNICAL FIELD

The present invention relates to a superabsorbent polymer and a preparation method thereof. More particularly, the present invention relates to a superabsorbent polymer having excellent basic absorption performances such as water retention capacity while having improved rewetting property and liquid permeability, and a preparation method thereof.

BACKGROUND ART

A superabsorbent polymer (SAP) is a synthetic polymeric material capable of absorbing moisture from 500 to 1000 times its own weight. Various manufacturers have denominated it as different names, such as SAM (Super Absorbency Material), AGM (Absorbent Gel Material), etc. Since such superabsorbent polymers started to be practically applied in sanitary products, now they have been widely used not only for hygiene products such as disposable diapers for children, sanitary pads, etc., but also for water retaining soil products for gardening, water stop materials for the civil engineering and construction, sheets for raising seedling, fresh-keeping agents for food distribution fields, materials for poultice or the like.

In most cases, these superabsorbent polymers have been widely used in the field of hygienic materials such as diapers, sanitary pads, etc. For these applications, superabsorbent polymers are required to exhibit high absorbency with respect to water, etc., and not to release the absorbed water even under an external pressure. In addition, superabsorbent polymers are required to well retain the shape even in a state, in which the volume is expanded (swelled) by absorbing water, and to exhibit excellent liquid permeability.

Further, a pressure by a user's weight may be applied to hygiene materials such as diapers, sanitary pads, etc. In particular, when liquid is absorbed by the superabsorbent polymer used in hygiene materials such as diapers, sanitary pads, etc., and then a pressure by a user's weight is applied thereto, a rewetting phenomenon, in which some liquid absorbed into the superabsorbent polymer is re-exuded, and a urine leakage phenomenon may occur.

Accordingly, various attempts have been made to suppress such a rewetting phenomenon. However, concrete methods capable of effectively suppressing the rewetting phenomenon have not yet been suggested.

DISCLOSURE

Technical Problem

To solve the above problems of the prior art, there are provided a superabsorbent polymer capable of suppressing rewetting and urine leakage phenomena, and a preparation method thereof.

Technical Solution

To achieve the above object, according to one aspect of the present invention, provided is a method of preparing a superabsorbent polymer, the method including the steps of:
 preparing a base resin in which an acrylic acid-based monomer having acidic groups which are at least partially neutralized and an internal crosslinking agent are crosslinked; and
 heating the base resin in the presence of a surface crosslinking agent to carry out surface modification of the base resin,
 wherein the internal crosslinking agent includes a first epoxy crosslinking agent having an epoxy equivalent weight of 100 g/eq or more to less than 130 g/eq, and a second epoxy crosslinking agent having an epoxy equivalent weight of 130 g/eq or more.

Further, according to another aspect of the present invention, provided is a superabsorbent polymer including:
 a base resin including a crosslinked polymer in which an acrylic acid-based monomer having acidic groups which are at least partially neutralized is crosslinked in the presence of an internal crosslinking agent including a first epoxy crosslinking agent having an epoxy equivalent weight of 100 g/eq or more to less than 130 g/eq, and a second epoxy crosslinking agent having an epoxy equivalent weight of 130 g/eq or more; and
 a surface crosslinked layer which is formed on the particle surface of the base resin and is prepared by further crosslinking the crosslinked polymer via a surface crosslinking agent.

Effect of the Invention

According to a superabsorbent polymer and a preparation method thereof of the present invention, it is possible to provide a superabsorbent polymer having excellent basic absorption properties while suppressing a rewetting phenomenon and a urine leakage phenomenon.

BEST MODE FOR CARRYING OUT THE INVENTION

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the present invention.

Hereinafter, a method of preparing a superabsorbent polymer according to one embodiment of the preset invention will be described in detail.

The method of preparing a superabsorbent polymer according to one embodiment of the preset invention may include the steps of:

preparing a base resin in which an acrylic acid-based monomer having acidic groups which are at least partially neutralized and an internal crosslinking agent are crosslinked; and heating the base resin in the presence of a surface crosslinking agent to carry out surface modification of the base resin, wherein the internal crosslinking agent includes a first epoxy crosslinking agent having an epoxy equivalent weight of 100 g/eq or more to less than 130 g/eq, and a second epoxy crosslinking agent having an epoxy equivalent weight of 130 g/eq or more.

In the specification of the present invention, the "base resin" or "base resin powder" means a polymer in the form of particles or powder obtained by polymerizing a water-soluble ethylene-based unsaturated monomer, followed by drying and pulverizing. It refers to a polymer in a state in which the surface modification or surface crosslinking step described below is not performed.

A water-containing gel polymer obtained by the polymerization reaction of the acrylic acid-based monomer is subjected to drying, pulverizing, size-sorting, surface crosslinking, etc., and is marketed as a powdery superabsorbent polymer product.

In recent years, not only absorption properties of superabsorbent polymers, such as absorbency and liquid permeability, but also how dryness of the surface may be maintained in a situation where diapers are actually used may be an important measure for evaluating diaper characteristics.

It was found that the superabsorbent polymer obtained by the preparation method according to one embodiment of the present invention is superior in absorption properties such as water retention capacity, absorbency under pressure, and liquid permeability, may maintain a dry state even after being swollen with water, and may effectively prevent a rewetting phenomenon and a urine leakage phenomenon in which urine absorbed in the superabsorbent polymer is re-exuded, thereby completing the present invention.

In the method of preparing a superabsorbent polymer of the present invention, a monomer composition, as a raw material of the superabsorbent polymer, including an acrylic acid-based monomer having acidic groups which are at least partially neutralized, an internal crosslinking agent, and a polymerization initiator, is first prepared and polymerized to obtain a water-containing gel polymer, which is then dried, pulverized, and size-sorted to prepare a base resin.

This will be described in more detail below.

The monomer composition which is a raw material of the superabsorbent polymer includes an acrylic acid-based monomer having acidic groups which are at least partially neutralized and a polymerization initiator.

The acrylic acid-based monomer is a compound represented by the following Chemical Formula 1:

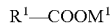   [Chemical Formula 1]

in Chemical Formula 1, $R^1$ is a C2 to C5 alkyl group having an unsaturated bond, and $M^1$ is a hydrogen atom, a monovalent or divalent metal, an ammonium group, or an organic amine salt.

Preferably, the acrylic acid-based monomer includes one or more selected from the group consisting of acrylic acid, methacrylic acid, and a monovalent metal salt thereof, a divalent metal salt thereof, an ammonium salt thereof, and an organic amine salt thereof.

Herein, the acrylic acid-based monomers may be those having acidic groups which are at least partially neutralized.

Preferably, the monomers may be those partially neutralized with an alkali substance such as sodium hydroxide, potassium hydroxide, ammonium hydroxide, etc. In this regard, a degree of neutralization of the acrylic acid-based monomer may be 40 mol % to 95 mol %, 40 mol % to 80 mol %, or 45 mol % to 75 mol %. The degree of neutralization may vary depending on the final physical properties. An excessively high degree of neutralization causes the neutralized monomers to be precipitated, and thus polymerization may not readily occur, whereas an excessively low degree of neutralization not only greatly deteriorates absorbency of the polymer, but also endows the polymer with hard-to-handle properties, such as those of an elastic rubber.

A concentration of the acrylic acid-based monomer may be about 20 wt % to about 60 wt %, preferably about 40 wt % to about 50 wt % with respect to the monomer composition including the raw material of the superabsorbent polymer and a solvent, and may be properly controlled in consideration of polymerization time, reaction conditions, etc. However, when the concentration of the monomer is excessively low, the yield of the superabsorbent polymer may become low and economical efficiency may be reduced. On the contrary, when the concentration of the monomer is excessively high, there is a process problem in that part of the monomers is precipitated, or pulverization efficiency is lowered upon pulverization of the polymerized water-containing gel polymer, and the physical properties of the superabsorbent polymer may be deteriorated.

In the method of preparing a superabsorbent polymer of the present invention, a polymerization initiator used upon polymerization is not particularly limited, as long as it is generally used in preparing superabsorbent polymers.

Specifically, the polymerization initiator may be a thermal polymerization initiator or a photo-polymerization initiator by UV radiation depending on the polymerization method. However, even in the case of the photo-polymerization method, a certain amount of heat may be generated by UV irradiation, etc., and a certain amount of heat is generated with exothermic polymerization reaction, and therefore, a thermal polymerization initiator may be further included.

As the photo-polymerization initiator, a compound capable of forming radicals by a light such as UV may be used without limitations in view of constitution.

For example, one or more selected from the group consisting of benzoin ether, dialkyl acetophenone, hydroxyl alkylketone, phenyl glyoxylate, benzyl dimethyl ketal, acyl phosphine, and α-aminoketone may be used as the photo-polymerization initiator. Meanwhile, as the specific example of acyl phosphine, commercially available lucirin TPO, namely, 2,4,6-trimethyl-benzoyl-trimethyl phosphine oxide may be used. More various photo-polymerization initiators are well disclosed in 'UV Coatings: Basics, Recent Developments and New Application (Elsevier, 2007)' written by Reinhold Schwalm, p 115, however, they are not limited to the above described examples.

The photo-polymerization initiator may be included in an amount of about 0.01% by weight to about 1.0% by weight with respect to the monomer composition. If the concentration of the photo-polymerization initiator is too low, the polymerization rate may become low. If the concentration of the photo-polymerization initiator is too high, the molecular weight of the superabsorbent polymer may become low and its physical properties may not be uniform.

Further, one or more selected from the group consisting of persulfate-based initiators, azo-based initiators, hydrogen peroxide, and ascorbic acid may be used as the thermal polymerization initiator. Specific examples of the persulfate-based initiators may include sodium persulfate ($Na_2S_2O_8$), potassium persulfate ($K_2S_2O_8$), ammonium persulfate (($NH_4)_2S_2O_8$) or the like. Examples of the azo-based initiators may include 2,2-azobis(2-amidinopropane)dihydrochloride, 2,2-azobis-(N,N-dimethylene)isobutyramidine dihydrochloride, 2-(carbamoylazo)isobutyronitrile, 2,2-azobis(2-[2-imidazolin-2-yl]propane)dihydrochloride, 4,4-azobis-(4-cyanovaleric acid) or the like. More various thermal polymerization initiators are well-disclosed in 'Principle of Polymerization (Wiley, 1981)' written by Odian, p 203, however, they are not limited to the above described examples.

According to one exemplary embodiment of the present invention, the monomer composition includes an internal crosslinking agent as a raw material of the superabsorbent polymer. The internal crosslinking agent is for cross-linking the interior of the polymerized polymer of the acrylic acid-based monomer, and is distinguished from a surface crosslinking agent for cross-linking the surface of the polymer.

In the present invention, epoxy-based crosslinking agents may be included as the internal crosslinking agent, and a first epoxy crosslinking agent having an epoxy equivalent weight of 100 g/eq or more to less than 130 g/eq and a second epoxy crosslinking agent having an epoxy equivalent weight of 130 g/eq or more are used at the same time.

As described, when the internal crosslinking agents having different epoxy equivalent weights are used at the same time, the two kinds of crosslinking agents form different network structures, and thus liquid permeability and rewetting property of the superabsorbent polymer may be greatly improved, as compared with use of a single crosslinking agent.

In other words, as two kinds of crosslinking agents are chemically bound to the main chain of the polymer, each part of the crosslinked polymer networks exhibits different flexibility, and therefore, when the produced superabsorbent polymer absorbs water, the degree of gel shrinkage against an external pressure and flow characteristics of water may vary. Due to this structure, the superabsorbent polymer may exhibit improved rewetting properties and liquid permeability.

In the method of preparing a superabsorbent polymer of the present invention, only the first and second epoxy crosslinking agents may be used as the internal crosslinking agent, or an internal crosslinking agent commonly used may be further used, in addition to the first and second epoxy crosslinking agents. However, to secure the effects of improving the liquid permeability and the rewetting property of the superabsorbent polymer, it is more preferable that only the first and second epoxy crosslinking agents are used.

As the first and second epoxy internal crosslinking agents, a crosslinking agent having two or more epoxy functional groups capable of reacting with the carboxylic acid and carboxylate of the acrylic acid-based monomer may be used.

The first epoxy crosslinking agent may be used for overall internal crosslinking of the polymer which is obtained by polymerizing the acrylic acid-based monomers, and an epoxy crosslinking agent having an epoxy equivalent weight of 100 g/eq or more, or 110 g/eq or more, and less than 130 g/eq, or 125 g/eq or less, and having two or more, preferably, two epoxy functional groups in the molecule may be used. When the epoxy equivalent weight of the first epoxy crosslinking agent is less than 100 g/eq, there is a problem in that flexibility of the crosslinked polymer network may decrease and absorbency of the superabsorbent polymer may decrease. On the contrary, when the first epoxy crosslinking agent has the high epoxy equivalent weight of 130 g/eq or more, there is a problem in that a uniform crosslinking structure may not be formed.

Specifically, the first epoxy crosslinking agent may be ethylene glycol diglycidyl ether, diethylene glycol diglycidyl ether, or a combination thereof.

Preferably, the first epoxy crosslinking agent may be ethylene glycol diglycidyl ether or diethylene glycol diglycidyl ether having an epoxy equivalent weight of 110 g/eq to 125 g/eq.

As the second epoxy crosslinking agent, an epoxy crosslinking agent having a higher epoxy equivalent weight than the first epoxy crosslinking agent may be used in order to obtain a double crosslinking effect. Specifically, an epoxy crosslinking agent having an epoxy equivalent weight of 130 g/eq or more, 150 g/eq or more, or 180 g/eq or more, and 400 g/eq or less, or 380 g/eq or less may be used. When the epoxy equivalent weight of the second epoxy crosslinking agent is too high, the length of the crosslinked chain may be too long, leading to problems in gel strength, and thus it is preferable to satisfy the above range.

As the second epoxy crosslinking agent, a bifunctional epoxy crosslinking agent may be appropriately used. Specifically, one or more of poly(ethylene glycol) diglycidyl ethers having 3 to 15 ethylene glycol ($-CH_2CH_2O-$) repeating units may be used. Preferably, the second epoxy crosslinking agent may be poly(ethylene glycol) diglycidyl ether having 4 to 13 ethylene glycol repeating units. Preferably, the second epoxy crosslinking agent may be poly(ethylene glycol) diglycidyl ether having an epoxy equivalent weight of 180 g/eq to 380 g/eq and having 4 to 13 ethylene glycol repeating units.

The internal crosslinking agent may be included in an amount of 0.001 part by weight to 1.0 part by weight with respect to 100 parts by weight of the acrylic acid-based monomer, thereby crosslinking the polymerized polymer.

In this regard, the first epoxy crosslinking agent and the second epoxy crosslinking agent may be included in an amount of 0.01 part by weight to 0.5 parts by weight with respect to 100 parts by weight of the acrylic acid-based monomer, respectively. Specifically, the first epoxy crosslinking agent may be included in an amount of 0.1 part by weight to 0.3 parts by weight with respect to 100 parts by weight of the acrylic acid-based monomer, and the second epoxy crosslinking agent may be included in an amount of 0.01 part by weight to 0.15 parts by weight with respect to 100 parts by weight of the acrylic acid-based monomer.

Meanwhile, a content ratio of the first epoxy crosslinking agent and the second epoxy crosslinking agent is not particularly limited, and may be appropriately controlled according to the kind and characteristics of the used crosslinking agents. However, to secure an appropriate crosslinking degree of the polymer and flexibility and gel strength of the crosslinked polymer network, a weight ratio of first epoxy crosslinking agent:second epoxy crosslinking agent may be preferably 1:1 to 30:1, or 1.1:1 to 27:1.

In the preparation method of the present invention, the monomer composition of the superabsorbent polymer may further include an additive such as a thickener, a plasticizer, a preservation stabilizer, an antioxidant, etc., if necessary.

The raw materials such as the above-described acrylic acid-based monomer having acidic groups which are at least partially neutralized, photo-polymerization initiator, thermal polymerization initiator, internal crosslinking agent, and additive may be prepared in the form of a monomer composition solution in which the raw materials are dissolved in a solvent.

As the solvent to be applicable, any solvent may be used without limitations in view of the constitution as long as it is able to dissolve the above components, and for example, one or more selected from water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, and N,N-dimethylacetamide may be used in combination.

The solvent may be included at a residual quantity except for the above components with respect to the total weight of the monomer composition.

Meanwhile, the method of preparing the water-containing gel polymer by thermal polymerization or photo-polymerization of the monomer composition is not particularly limited, as long as it is a common polymerization method.

Specifically, the polymerization method is largely classified into the thermal polymerization and the photo-polymerization according to a polymerization energy source. The thermal polymerization may be commonly carried out in a reactor like a kneader equipped with agitating spindles whereas the photo-polymerization may be carried out in a reactor equipped with a movable conveyor belt. The above-described polymerization method is an example only, and the present invention is not limited to the above-described polymerization methods.

For example, the water-containing gel polymer may be obtained by performing thermal polymerization while providing hot air to the above-described reactor like a kneader equipped with the agitating spindles or heating the reactor. The water-containing gel polymer may have a size of centimeters or millimeters when it is discharged from an outlet of the reactor, according to the type of agitating spindles equipped in the reactor. Specifically, the size of the obtained water-containing gel polymer may vary depending on a concentration of the monomer composition fed thereto, a feeding speed or the like, and the water-containing gel polymer having a weight average particle size of 2 mm to 50 mm may be generally obtained.

Further, as described above, when the photo-polymerization is carried out in a reactor equipped with a movable conveyor belt, the obtained water-containing gel polymer may be usually a sheet-like water-containing gel polymer having a width of the belt. In this case, the thickness of the polymer sheet may vary depending on the concentration of the monomer composition fed thereto and the feeding speed. Usually, it is preferable to supply the monomer composition so that a sheet-like polymer having a thickness of about 0.5 cm to about 5 cm may be obtained. When the monomer composition is supplied to such an extent that the thickness of the sheet-like polymer becomes too thin, it is undesirable because the production efficiency is low, and when the thickness of the sheet-like polymer is more than 5 cm, the polymerization reaction may not evenly occur over the entire thickness because of the excessive thickness.

The water-containing gel polymer obtained by the above-mentioned method may have a water content of about 40% by weight to about 80% by weight. Meanwhile, the "water content" as used herein means a weight occupied by water with respect to the total weight of the water-containing gel polymer, which may be a value obtained by subtracting the weight of the dried polymer from the weight of the water-containing gel polymer. Specifically, the water content may be defined as a value calculated by measuring the weight loss due to evaporation of moisture in the polymer during the process of drying by raising the temperature of the polymer through infrared heating. At this time, the water content is measured under the drying conditions determined as follows: the drying temperature is increased from room temperature to about 180° C. and then the temperature is maintained at 180° C., and the total drying time is set to 20 minutes, including 5 minutes for the temperature rising step.

Next, the step of drying the obtained water-containing gel polymer is performed.

Herein, to increase the drying efficiency, a coarse pulverizing step may be further performed before the drying step, if necessary.

In this regard, a pulverizer used here is not limited by its configuration, and specifically, it may include any one selected from the group consisting of a vertical pulverizer, a turbo cutter, a turbo grinder, a rotary cutter mill, a cutter mill, a disc mill, a shred crusher, a crusher, a chopper, and a disc cutter, but is not limited to the above-described examples.

In this regard, the pulverization step may be carried out so that the particle diameter of the water-containing gel polymer becomes about 2 mm to about 10 mm.

Pulverizing of the water-containing gel polymer into a particle diameter of less than 2 mm is not technically easy due to its high water content, and an agglomeration phenomenon between the pulverized particles may occur. Meanwhile, when the polymer is pulverized into a particle diameter of greater than 10 mm, the effect of increasing the efficiency in the subsequent drying step may be insignificant.

The water-containing gel polymer pulverized as above or the water-containing gel polymer immediately after polymerization without the pulverizing step is subjected to a drying step. In this regard, a drying temperature of the drying step may be about 150° C. to about 250° C. When the drying temperature is lower than 150° C., the drying time becomes too long and the physical properties of the final superabsorbent polymer may be deteriorated. When the drying temperature is higher than 250° C., only the polymer surface is excessively dried, and thus fine powder may be generated during the subsequent pulverization process and the physical properties of the superabsorbent polymer finally formed may be deteriorated. Therefore, the drying may be preferably performed at a temperature of about 150° C. to about 200° C., and more preferably at a temperature of about 160° C. to about 180° C.

Meanwhile, the drying step may be carried out for about 20 minutes to about 90 minutes, in consideration of the process efficiency, but is not limited thereto.

In the drying step, any drying method may be selected and used without limitation in view of constitution, as long as it is commonly used in the process of drying the water-containing gel polymer. Specifically, the drying step may be carried out by a method such as hot air supply, infrared irradiation, microwave irradiation or ultraviolet irradiation. When the drying step as above is finished, the water content of the polymer may be about 0.1% by weight to about 10% by weight.

Next, the step of pulverizing the dried polymer obtained through the drying step is performed.

The polymer powder obtained through the pulverizing step may have a particle diameter of about 150 μm to about 850 μm. Specific examples of a pulverizer that may be used to achieve the above particle diameter may include a pin mill, a hammer mill, a screw mill, a roll mill, a disc mill, a jog mill, etc., but the present invention is not limited to the above-described examples.

In order to manage the physical properties of the superabsorbent polymer powder that is finally commercialized after the pulverization step, a separate process of size-sorting the polymer powders obtained after the pulverization according to the particle size may be carried out. The polymer powders may be size-sorted to have a constant weight ratio according to the particle size.

Next, the dried and pulverized polymer, i.e., the base resin is mixed with a surface crosslinking agent.

In the general method of preparing a superabsorbent polymer, a surface crosslinking solution containing a surface crosslinking agent is mixed with a dried and pulverized polymer, that is, a base resin, and then the mixture is heated to carry out a surface crosslinking reaction of the pulverized polymer.

The surface crosslinking step is a step of inducing a crosslinking reaction on the surface of the pulverized polymer in the presence of a surface crosslinking agent to form a superabsorbent polymer having improved physical properties. Through the surface crosslinking, a surface cross-linked layer (surface modified layer) is formed on the surface of the pulverized polymer particles.

Generally, surface crosslinking agents are applied on the surface of the superabsorbent polymer particles, so that surface crosslinking reactions occur on the surface of the superabsorbent polymer particles, which improves crosslinkability on the surface of the particles without substantially affecting the interior of the particles. Therefore, the surface crosslinked superabsorbent polymer particles have a higher degree of crosslinking near the surface than in the interior.

Meanwhile, the surface crosslinking agent is a compound capable of reacting with functional groups of the polymer. For example, polyalcohol compounds, epoxy compounds, polyamine compounds, haloepoxy compounds, condensates of haloepoxy compounds, oxazoline compounds, multivalent metal salts, or alkylene carbonate compounds may be used.

Preferably, to further improve absorbency without deteriorating the rewetting property of the superabsorbent polymer, epoxy-based surface crosslinking agents may be used.

Examples of the epoxy-based surface crosslinking agent satisfying the above conditions may include ethylene glycol diglycidyl ether, diethylene glycol diglycidyl ether, triethyleneglycol diglycidyl ether, tetraethyleneglycol diglycidyl ether, glycerin polyglycidyl ether, sorbitol polyglycidyl ether, etc.

The amount of the epoxy-based surface crosslinking agent to be added may be about 0.005 parts by weight or more, or about 0.01 part by weight or more, or about 0.02 parts by weight or more, and about 0.2 parts by weight or less, or about 0.1 part by weight or less, or 0.05 parts by weight or less with respect to 100 parts by weight of the base resin.

When the amount of the epoxy-based surface crosslinking agent is too small, crosslinking density of the surface crosslinked layer is too low, and absorption properties such as absorbency under pressure, liquid permeability becomes low, and when the amount thereof is too large, the rewetting property may deteriorate due to excessive surface crosslinking reaction.

When the epoxy-based surface crosslinking agent is added, it is additionally mixed with water, and then added in the form of a surface crosslinking solution. When water is added, it is advantageous in that the surface crosslinking agent may be evenly dispersed in the polymer. At this time, the amount of water to be added may be preferably about 1 part by weight to about 10 parts by weight with respect to 100 parts by weight of the polymer in order to induce uniform dispersion of the surface crosslinking agent, to prevent agglomeration of the polymer powder, and at the same time, to optimize the surface penetration depth of the surface crosslinking agent.

Meanwhile, in addition to the above-described surface crosslinking agent, a multivalent metal salt, for example, an aluminum salt, more specifically, one or more selected from the group consisting of sulfates, potassium salts, ammonium salts, sodium salts, and hydrochloride salts of aluminum may be further included.

As the multivalent metal salt is additionally used, the liquid permeability of the superabsorbent polymer prepared by the method of one embodiment may be further improved. The multivalent metal salt may be added, together with the surface crosslinking agent, to the surface crosslinking solution, and may be used in an amount of 0.01 part by weight to 4 parts by weight with respect to 100 parts by weight of the base resin.

Meanwhile, before raising the temperature in order to perform surface crosslinking reaction by mixing the base resin with the surface crosslinking agent, the base resin is optionally mixed with a hydrophobic material, thereby further enhancing the rewetting property. The surface crosslinking efficiency may also be improved, thereby further enhancing absorption rate and liquid permeability, as compared with a resin of using no hydrophobic material.

As the hydrophobic material, a material having HLB meeting the lower limit of 0 or more, or 1 or more, or 2 or more, and the upper limit of 6 or less, or 5 or less, or 5.5 or less may be used. Further, since the hydrophobic material must be melted during the surface crosslinking reaction and must be placed in the surface-modified layer of the base resin, a material having a melting point lower than the surface crosslinking reaction temperature may be used.

Examples of the applicable hydrophobic material may include glyceryl stearate, glycol stearate, magnesium stearate, glyceryl laurate, sorbitan stearate, sorbitan trioleate, PEG-4 dilaurate, etc. Preferably, glyceryl stearate or glyceryl laurate may be used, but the present invention is not limited thereto.

The hydrophobic material is distributed in the surface-modified layer of the surface of the base resin to prevent agglomeration or aggregation between the swelled resin particles due to the increased pressure when the superabsorbent polymer swells by absorbing a liquid, and the hydrophobic material provides the surface with hydrophobicity, thereby further facilitating liquid permeation and diffusion. Therefore, the hydrophobic material may contribute to improving the rewetting property of the superabsorbent polymer.

The hydrophobic material may be mixed in an amount of about 0.02 parts by weight or more, or about 0.025 parts by weight or more, or about 0.05 parts by weight or more, and about 0.5 parts by weight or less, or about 0.3 parts by weight or less, or about 0.1 parts by weight or less with respect to 100 parts by weight of the base resin. If the amount of the hydrophobic material is as too small as less than 0.02 parts by weight, it may be insufficient to improve rewetting property. If the amount of the hydrophobic material is as too large as more than 0.5 parts by weight, the base resin and the hydrophobic material may be separated from each other, and thus there is a problem in that the effect of improving the rewetting property may not be obtained or it may act as an impurity. In this point of view, the hydrophobic material may be preferably used in the above range of part by weight.

A method of mixing the hydrophobic material may be appropriately adopted without particular limitation, as long as it is able to evenly mix the hydrophobic material with the base resin.

For example, the hydrophobic material may be dry-mixed before mixing the base resin with the surface crosslinking solution containing the epoxy-based surface crosslinking agents, or the hydrophobic material may be dispersed, together with the surface crosslinking agents, in the surface crosslinking solution, and then mixed with the base resin. Alternatively, separately from the surface crosslinking solution, the hydrophobic material may be heated to a melting point or higher, and mixed in a solution state.

Next, the step of surface-modifying the base resin may be performed by raising the temperature of the mixture of the base resin and the epoxy-based surface crosslinking agents by heating.

The surface modification step may be performed by heating at a temperature of about 120° C. to about 190° C., preferably about 130° C. to about 180° C. for about 10 minutes to about 90 minutes, preferably about 20 minutes to about 70 minutes. If the crosslinking reaction temperature is lower than 120° C. or the reaction time is too short, the surface crosslinking reaction does not properly occur and thus permeability may be reduced, and if the crosslinking reaction temperature is higher than 190° C. or the reaction time is too long, there is a problem in that water retention capacity may be reduced.

A means for raising the temperature for surface modification reaction is not particularly limited. Heating may be performed by providing a heating medium or by directly providing a heat source. In this regard, the kind of the applicable heating medium may include a hot fluid such as steam, hot air, hot oil or the like, but the present invention is not limited thereto. The temperature of the heating medium to be provided may be properly controlled in consideration of the means of the heating medium, the heating rate, and the target temperature. Meanwhile, as the heat source to be directly provided, an electric heater or a gas heater may be used, but the present invention is not limited to these examples.

By the above surface modification step, a surface crosslinked structure formed by reacting the functional groups of epoxy-based surface crosslinking agents with the functional groups of the base resin is formed on the surface of the base resin. Inside this surface-crosslinked structure, a surface-modified layer in which the above-described hydrophobic material is uniformly distributed may be formed.

Therefore, as the base resin has the double crosslinking structure due to the two kinds of epoxy-based internal crosslinking agents having the different epoxy equivalent weights, the superabsorbent polymer prepared by the preparation method of the present invention may have improved rewetting property and initial absorption rate without deterioration in the physical properties such as water retention capacity and absorbency under pressure.

According to another embodiment of the present invention, provided is a superabsorbent polymer including: a base resin including a crosslinked polymer in which an acrylic acid-based monomer having acidic groups which are at least partially neutralized is crosslinked in the presence of an internal crosslinking agent including a first epoxy crosslinking agent having an epoxy equivalent weight of 100 g/eq or more to less than 130 g/eq, and a second epoxy crosslinking agent having an epoxy equivalent weight of 130 g/eq or more; and a surface crosslinked layer which is formed on the particle surface of the base resin and is prepared by further crosslinking the crosslinked polymer via a surface crosslinking agent.

Detailed descriptions of a specific method of preparing the superabsorbent polymer and physical properties thereof are the same as those described in the method of preparing a superabsorbent polymer.

The superabsorbent polymer may have centrifuge retention capacity (CRC) in the range of about 25 g/g or more, about 29 g/g or more, or about 30 g/g or more, and about 40 g/g or less, about 38 g/g or less, or about 35 g/g or less, as measured in accordance with the EDANA method WSP 241.3.

Further, the superabsorbent polymer may have liquid permeability (unit; sec) of about 35 seconds or less, or about 30 seconds or less, as measured according to the following Equation 1. As the value of the liquid permeability is smaller, it means more excellent liquid permeability. Therefore, the theoretical lower limit is 0 second, but it may be, for example, about 5 seconds or more, or about 10 seconds or more, or about 12 seconds or more.

$$\text{Liquid permeability(sec)} = T1 - B \qquad \text{[Equation 1]}$$

wherein, in Equation 1, T1 represents a time taken for a liquid level to decrease from 40 ml to 20 ml, when 0.2±0.0005 g of a size-sorted superabsorbent polymer sample (300 μm~600 μm) is put in a chromatography column, brine is applied thereto at a volume of 50 ml, and then left for 30 minutes, and B represents a time taken for a liquid level in the brine-filled chromatography column to decrease from 40 ml to 20 ml.

Further, the superabsorbent polymer may exhibit more improved rewetting property while exhibiting excellent absorption properties.

More specifically, the superabsorbent polymer may have the rewetting property (long-term tap water rewetting under pressure) of 1.0 g or less, 0.9 g or less, 0.8 g or less, or 0.76 g or less, the rewetting property defined by the weight of water that soaks out from the superabsorbent polymer to a filter paper, when 4 g of the superabsorbent polymer is immersed in 200 g of tap water and allowed to swell for 2 hours, and then the swollen superabsorbent polymer is left on the filter paper under a pressure of 0.75 psi for 1 minute. As the weight of the water is smaller, it means more excellent rewetting property. Therefore, the theoretical lower limit is 0 g, but it may be, for example, 0.1 g or more, 0.2 g or more, or 0.3 g or more. The tap water used in the evaluation of the rewetting property has conductivity of 140 μS/cm to 150 μS/cm. Since the conductivity of tap water greatly influences the properties to be measured, it is necessary to measure the physical properties such as rewetting property by using tap water having conductivity equivalent thereto.

As described above, the superabsorbent polymer of the present invention may have excellent absorbency and may suppress rewetting and urine leakage phenomena even at the time of absorbing a large amount of urine.

The present invention will be described in more detail with reference to the following Examples. However, the following Examples are only for illustrating the present invention, and the description of the present invention is not limited by the following Examples.

EXAMPLE

Preparation of Superabsorbent Polymer

Example 1

(1) Preparation of Base Resin 518 g of acrylic acid, 1.40 g (0.27 parts by weight with respect to 100 parts by weight of acrylic acid) of ethylene glycol diglycidyl ether (EGDGE, epoxy equivalent weight of 113 g/eq), 0.052 g (0.01 part by weight with respect to 100 parts by weight of acrylic acid) of poly(ethylene glycol) diglycidyl ether having 4 ethylene glycol repeating units (PEGDGE, epoxy equivalent weight of 185 g/eq), and 0.04 g of diphenyl(2,4,6-trimethylbenzoyl)-phosphine oxide were added to a 3-L glass container equipped with a stirrer, a nitrogen feeder, and a thermometer, and dissolved. Then, 822.2 g of 24.5% sodium hydroxide solution was added thereto and nitrogen was continuously injected to prepare a water-soluble unsaturated monomer aqueous solution. The water-soluble unsaturated monomer aqueous solution was cooled to 40° C.

500 g of this aqueous solution was fed to a stainless steel container having a width of 250 mm, a length of 250 mm, and a height of 30 mm, and UV polymerization was performed by UV radiation (exposure dose: 10 mV/cm$^2$) for 90 seconds to obtain a water-containing gel polymer. The water-containing gel polymer thus obtained was pulverized to a size of 2 mm*2 mm, and then the obtained gel-type resin was spread as thick as about 30 mm on a stainless wire gauze having a hole size of 600 μm and dried in a hot air oven at 180° C. for 30 minutes. The dry polymer thus obtained was pulverized with a pulverizer, and then size-sorted through an ASTM standard sieve to obtain a base resin having a particle size of 150 μm to 850 μm.

(2) Preparation of Superabsorbent Polymer

A surface crosslinking solution containing 6.2 parts by weight of water, 0.02 parts by weight of ethylene glycol diglycidyl ether, 0.2 parts by weight of aluminum sulfate, and 0.03 parts by weight of glyceryl stearate (HLB 3.8) was sprayed onto 100 parts by weight of the base resin, and mixed with each other. This mixture was put in a container equipped with a stirrer and a double jacket, and a surface crosslinking reaction was performed at 140° C. for 35 minutes. Thereafter, the surface-treated powder was size-sorted through an ASTM standard sieve to obtain a superabsorbent polymer powder having a particle size of 150 μm to 850 μm.

Example 2

A superabsorbent polymer powder was obtained in the same manner as in Example 1, except that 0.23 parts by weight of ethylene glycol diglycidyl ether and 0.05 parts by weight of poly(ethylene glycol) diglycidyl ether having 4 ethylene glycol repeating units were used with respect to 100 parts by weight of acrylic acid in step (1).

Example 3

A superabsorbent polymer powder was obtained in the same manner as in Example 1, except that 0.18 parts by weight of ethylene glycol diglycidyl ether and 0.10 part by weight of poly(ethylene glycol) diglycidyl ether having 4 ethylene glycol repeating units were used with respect to 100 parts by weight of acrylic acid in step (1).

Example 4

A superabsorbent polymer powder was obtained in the same manner as in Example 1, except that 0.15 parts by weight of ethylene glycol diglycidyl ether and 0.13 part by weight of poly(ethylene glycol) diglycidyl ether having 4 ethylene glycol repeating units were used with respect to 100 parts by weight of acrylic acid in step (1).

Example 5

A superabsorbent polymer powder was obtained in the same manner as in Example 2, except that poly(ethylene glycol) diglycidyl ether (epoxy equivalent weight of 268 g/eq having 9 ethylene glycol repeating units was used instead of poly(ethylene glycol) diglycidyl ether having 4 ethylene glycol repeating units in step (1).

Example 6

A superabsorbent polymer powder was obtained in the same manner as in Example 2, except that poly(ethylene glycol) diglycidyl ether (epoxy equivalent weight of 372 g/eq having 13 ethylene glycol repeating units was used instead of poly(ethylene glycol) diglycidyl ether having 4 ethylene glycol repeating units in step (1).

Example 7

A superabsorbent polymer powder was obtained in the same manner as in Example 2, except that diethylene glycol diglycidyl ether (DGDGE, epoxy equivalent weight of 122 g/eq) was used instead of ethylene glycol diglycidyl ether in step (1).

Example 8

A superabsorbent polymer powder was obtained in the same manner as in Example 3, except that diethylene glycol diglycidyl ether (DGDGE, epoxy equivalent weight of 122 g/eq) was used instead of ethylene glycol diglycidyl ether in step (1).

Example 9

A superabsorbent polymer powder was obtained in the same manner as in Example 7, except that poly(ethylene glycol) diglycidyl ether (epoxy equivalent weight of 268 g/eq having 9 ethylene glycol repeating units was used instead of poly(ethylene glycol) diglycidyl ether having 4 ethylene glycol repeating units in step (1).

Example 10

A superabsorbent polymer powder was obtained in the same manner as in Example 7, except that poly(ethylene glycol) diglycidyl ether (epoxy equivalent weight of 372 g/eq having 13 ethylene glycol repeating units was used instead of poly(ethylene glycol) diglycidyl ether having 4 ethylene glycol repeating units in step (1).

Comparative Example 1

A superabsorbent polymer powder was obtained in the same manner as in Example 1, except that, as the internal crosslinking agent, poly(ethylene glycol) diglycidyl ether having 4 ethylene glycol repeating units was not included, and only ethylene glycol diglycidyl ether was used in an amount of 0.28 parts by weight with respect to 100 parts by weight of acrylic acid in step (1).

Comparative Example 2

A superabsorbent polymer powder was obtained in the same manner as in Example 1, except that, as the internal crosslinking agent, poly(ethylene glycol) diglycidyl ether having 4 ethylene glycol repeating units was not included, and only ethylene glycol diglycidyl ether was used in an amount of 0.32 parts by weight with respect to 100 parts by weight of acrylic acid in step (1).

Comparative Example 3

A superabsorbent polymer powder was obtained in the same manner as in Example 1, except that, as the internal crosslinking agent, poly(ethylene glycol) diglycidyl ether having 4 ethylene glycol repeating units was not included, and only diethylene glycol diglycidyl ether (DGDGE, epoxy equivalent weight of 122 g/eq) was used in an amount of 0.28 parts by weight with respect to 100 parts by weight of acrylic acid in step (1).

Comparative Example 4

A superabsorbent polymer powder was obtained in the same manner as in Example 1, except that, as the internal crosslinking agent, ethylene glycol diglycidyl ether was not included, and only poly(ethylene glycol) diglycidyl ether having 4 ethylene glycol repeating units was used in an amount of 0.28 parts by weight with respect to 100 parts by weight of acrylic acid in step (1).

Experimental Example

Physical properties were evaluated for the superabsorbent polymers prepared in Examples and Comparative Examples by the following methods.

Unless otherwise indicated, the following physical properties were all evaluated at constant temperature and humidity (23±1° C., relative humidity of 50±10%), and physiological saline or brine means a 0.9 wt % sodium chloride (NaCl) aqueous solution.

Further, tap water used in the following evaluation of the rewetting property was tap water having a conductivity of 140 μS/cm to 150 μS/cm, as measured using Orion Star A222 (company: Thermo Scientific).

(1) Centrifuge Retention Capacity (CRC)

The centrifuge retention capacity by absorption capacity under no load was measured for each polymer in accordance with EDANA WSP 241.3.

In detail, after uniformly introducing $W_0(g)$ (about 0.2 g) of the superabsorbent polymer in a nonwoven fabric-made bag and sealing the same, it was immersed in physiological saline (0.9 wt %) at room temperature. After 30 minutes, the bag was dehydrated by using a centrifuge at 250 G for 3 minutes, and then the weight $W_2(g)$ of the bag was measured. Further, after carrying out the same operation without using the polymer, the weight $W_1(g)$ of the bag was measured. CRC (g/g) was calculated using each obtained weight according to the following Equation:

$$CRC(g/g) = \{[W_2(g) - W_1(g)]/W_0(g)\} - 1 \quad \text{[Equation 2]}$$

(2) Liquid Permeability

Lines were marked on the liquid levels of 20 ml and 40 ml in a chromatography column (F20 mm) with a piston. Thereafter, in order to prevent bubbles between a glass filter and a cock at the bottom of the chromatography column, water was injected upward and filled up to about 10 ml, and the column was washed 2-3 times with brine, and 0.9% brine was filled up to 40 ml or more. The piston was placed in the chromatography column, and the lower valve was opened to record the time (B) at which the liquid level decreased from the marked line of 40 ml to the marked line of 20 ml.

10 ml of brine was left in the chromatography column, 0.2±0.0005 g of the size-sorted superabsorbent polymer sample (300 to 600 μm) was added thereto, and brine was added up to 50 ml, and left for 30 minutes. Thereafter, a piston with a weight (0.3 psi=106.26 g) was placed in the chromatography column, and left for 1 minute. Then, the lower valve of the chromatography column was opened to record the time (T1) at which the liquid level decreased from the marked line of 40 ml to the marked line of 20 ml. The time (unit: second) of T1–B was calculated.

(3) Long-Term Tap Water Rewetting Under Pressure (2 Hrs)

① 4 g of the superabsorbent polymer was uniformly scattered on a petri dish with a diameter of 13 cm, and then 200 g of tap water was poured and allowed to swell for 2 hours.

② The superabsorbent polymer swollen for 2 hours was put on 20 sheets of filter paper (manufacturer: whatman, catalog No. 1004-110, pore size: 20-25 μm, diameter: 11 cm), and a weight of 5 kg (0.75 psi) with a diameter of 11 cm was applied thereto for 1 minute.

③ After applying the weight for 1 minute, the amount (unit: g) of tap water soaked into the filter paper was measured.

The values of the physical properties of Examples and Comparative Examples are described in Table 1 below.

TABLE 1

| | Content of internal crosslinking agent (parts by weight with respect to 100 parts by weight of acrylic acid) | | Superabsorbent polymer | | |
|---|---|---|---|---|---|
| | First crosslinking agent | Second crosslinking agent (PEGDGE, n: number of repeating units) | CRC (g/g) | Liquid permeability (sec ) | Long-term tap water rewetting under pressure (g) |
| Example 1 | 0.27(EGDGE) | 0.01 (n = 4) | 30.1 | 29 | 0.75 |
| Example 2 | 0.23(EGDGE) | 0.05 (n = 4) | 30.3 | 25 | 0.51 |
| Example 3 | 0.18(EGDGE) | 0.10 (n = 4) | 30.9 | 28 | 0.65 |
| Example 4 | 0.15(EGDGE) | 0.13 (n = 4) | 31.1 | 29 | 0.76 |

TABLE 1-continued

| | Content of internal crosslinking agent (parts by weight with respect to 100 parts by weight of acrylic acid) | | Superabsorbent polymer | | |
|---|---|---|---|---|---|
| | First crosslinking agent | Second crosslinking agent (PEGDGE, n: number of repeating units) | CRC (g/g) | Liquid permeability (sec) | Long-term tap water rewetting under pressure (g) |
| Example 5 | 0.23(EGDGE) | 0.05 (n = 9) | 30.4 | 28 | 0.62 |
| Example 6 | 0.23(EGDGE) | 0.05 (n = 13) | 30.4 | 29 | 0.65 |
| Example 7 | 0.23(DGDGE) | 0.05 (n = 4) | 30.4 | 26 | 0.55 |
| Example 8 | 0.18(DGDGE) | 0.10 (n = 4) | 30.9 | 29 | 0.65 |
| Example 9 | 0.23(DGDGE) | 0.05 (n = 9) | 30.6 | 28 | 0.62 |
| Example 10 | 0.23(DGDGE) | 0.05 (n = 13) | 30.8 | 29 | 0.66 |
| Comparative Example 1 | 0.28(EGDGE) | — | 30.1 | 37 | 0.84 |
| Comparative Example 2 | 0.32(EGDGE) | — | 28.5 | 28 | 1.21 |
| Comparative Example 3 | 0.28(DGDGE) | — | 30.3 | 37 | 0.83 |
| Comparative Example 4 | — | 0.28 (n = 4) | 31.5 | 36 | 0.80 |

Referring to Table 1, it was confirmed that Examples 1 to 10 exhibited excellent liquid permeability and rewetting property while having excellent water retention capacity. In contrast, Comparative Examples 1, 3, and 4, in which only one of the first and second epoxy-based crosslinking agents was used as the internal crosslinking agent, exhibited remarkably poor liquid permeability and rewetting property, as compared with Examples 1 to 10, in which the internal crosslinking agents were used in the equal amount. In addition, Comparative Example 2, in which one kind of the internal crosslinking agents was used, but the content of the crosslinking agent was increased, showed slightly improved liquid permeability, but showed poor water retention capacity and rewetting property.

These results suggest that the superabsorbent polymers according to the present invention maintain excellent basic absorption properties, such as water retention capacity, etc. while securing improved liquid permeability and rewetting property.

The invention claimed is:

1. A method of preparing a superabsorbent polymer comprising:
   preparing a base resin in which an acrylic acid-based monomer having acidic groups which are at least partially neutralized and an internal crosslinking agent are crosslinked; and
   heating the base resin in the presence of a surface crosslinking agent to carry out surface modification of the base resin,
   wherein the internal crosslinking agent includes a first epoxy crosslinking agent having an epoxy equivalent weight of 100 g/eq or more to less than 130 g/eq, and a second epoxy crosslinking agent having an epoxy equivalent weight of 130 g/eq or more, and
   wherein a weight ratio of first epoxy crosslinking agent: second epoxy crosslinking agent is 1.1:1 to 27:1; and
   wherein the internal crosslinking agent consists of the first epoxy crosslinking agent and the second epoxy crosslinking agent.

2. The method of claim 1, wherein the second epoxy crosslinking agent has an epoxy equivalent weight of 150 g/eq to 400 g/eq.

3. The method of claim 1, wherein the first epoxy crosslinking agent and the second epoxy crosslinking agent are included in an amount of 0.01 part by weight to 0.5 parts by weight, respectively, with respect to 100 parts by weight of the acrylic acid-based monomer.

4. The method of claim 1, wherein the first epoxy crosslinking agent is ethylene glycol diglycidyl ether, diethylene glycol diglycidyl ether, or a combination thereof.

5. The method of claim 1, wherein the second epoxy crosslinking agent is one or more of poly(ethylene glycol) diglycidyl ethers having 3 to 15 ethylene glycol repeating units.

6. The method of claim 1, wherein the surface modification of the base resin is performed in the presence of a hydrophobic material having HLB of 0 or more and 6 or less.

7. The method of claim 1, wherein the preparing the base resin includes:
   forming a water-containing gel polymer by polymerizing a monomer composition including the acrylic acid-based monomer having acidic groups which are at least partially neutralized, the internal crosslinking agent including the first epoxy crosslinking agent and the second epoxy crosslinking agent, and a polymerization initiator;
   drying the water-containing gel polymer;
   pulverizing the dried polymer; and
   size-sorting the pulverized polymer.

8. A superabsorbent polymer comprising:
   a base resin including a crosslinked polymer in which an acrylic acid-based monomer having acidic groups which are at least partially neutralized is crosslinked in the presence of an internal crosslinking agent including a first epoxy crosslinking agent having an epoxy equivalent weight of 100 g/eq or more to less than 130 g/eq, and a second epoxy crosslinking agent having an epoxy equivalent weight of 130 g/eq or more, wherein a weight ratio of first epoxy crosslinking agent: second epoxy crosslinking agent is 1.1:1 to 27:1; and
   wherein the internal crosslinking agent consists of the first epoxy crosslinking agent and the second epoxy crosslinking agent; and
   a surface crosslinked layer which is formed on the particle surface of the base resin and is prepared by further crosslinking the crosslinked polymer via a surface crosslinking agent.

9. The superabsorbent polymer of claim 8, wherein the superabsorbent polymer has a centrifuge retention capacity (CRC) of 25 g/g or more.

10. The superabsorbent polymer of claim 8, wherein the superabsorbent polymer has a liquid permeability of 30 seconds or less, as measured according to the following Equation 1:

$$\text{Liquid permeability(sec)} = T1 - B \quad \text{[Equation 1]}$$

where in Equation 1, T1 represents a time taken for a liquid level to decrease from 40 ml to 20 ml, when 0.2±0.0005 g of a size-sorted superabsorbent polymer sample (300 μm~600 μm) is put in a chromatography column, brine is applied thereto at a volume of 50 ml, and then left for 30 minutes, and B represents a time taken for a liquid level in the brine-filled chromatography column to decrease from 40 ml to 20 ml.

11. The superabsorbent polymer of claim 8, wherein the superabsorbent polymer has a long-term tap water rewetting property under pressure of 1.0 g or less, the long-term tap water rewetting property defined by the weight of water that soaks out from the superabsorbent polymer to a filter paper, when 4 g of the superabsorbent polymer is immersed in 200 g of tap water and allowed to swell for 2 hours, and then the swollen superabsorbent polymer is left on the filter paper under a pressure of 0.75 psi for 1 minute.

12. The superabsorbent polymer of claim 8, wherein the second epoxy crosslinking agent has the epoxy equivalent weight of 130 g/eq or more to 400 g/eq or less.

13. The superabsorbent polymer of claim 9, wherein the CRC of the superabsorbent polymer is 29.5 g/g or more to 40 g/g or less.

* * * * *